United States Patent Office 3,671,298
Patented June 20, 1972

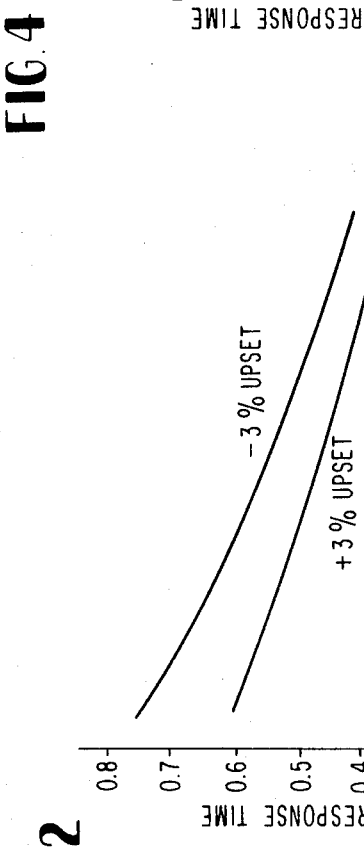
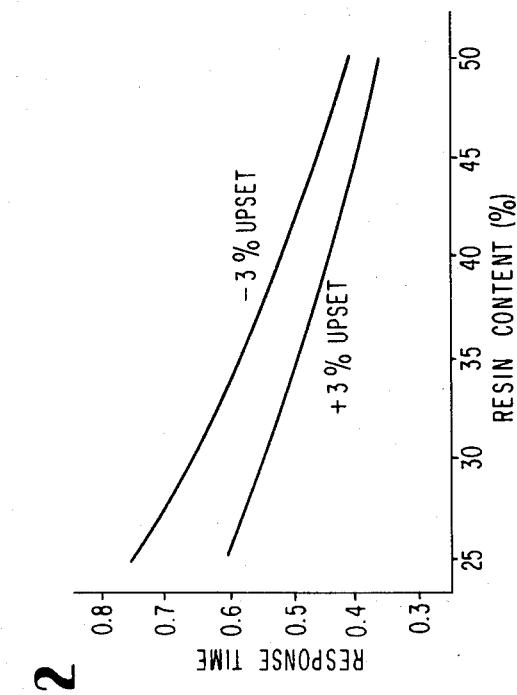
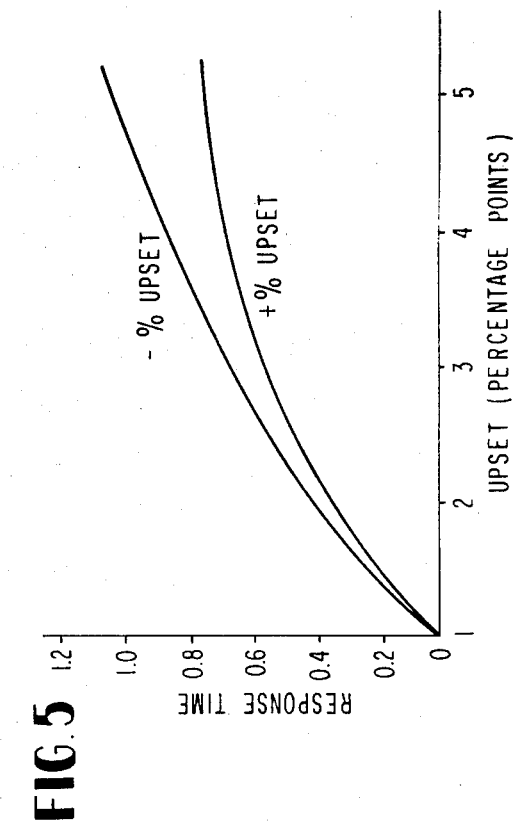
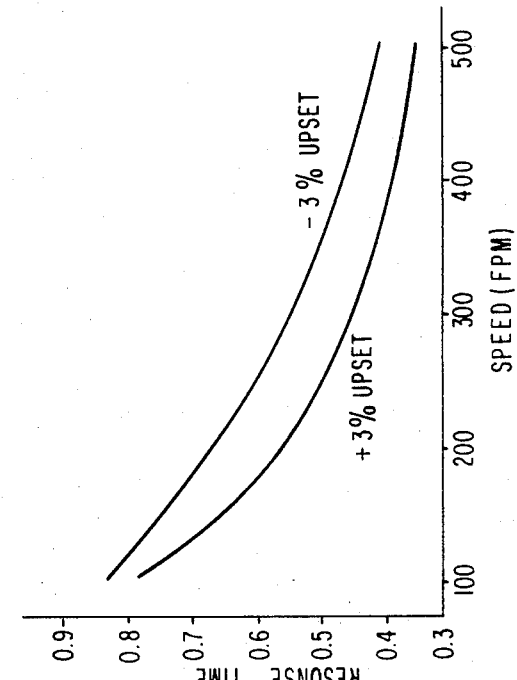

3,671,298
HYDRAULIC SYSTEM FOR CONTROLLING RESIN PICKUP
Maurice J. Maynard, Ridgefield, Conn., assignor to Westvaco Corporation, New York, N.Y.
Filed Oct. 30, 1970, Ser. No. 85,318
Int. Cl. B44d 1/06
U.S. Cl. 117—115                 3 Claims

ABSTRACT OF THE DISCLOSURE

This invention discloses a hydraulic system for resin pickup that will yield precise control of liquid addition without the need for sampling, testing and operator control. The system is based on precise introduction of a volume of liquid into the system at a volume rate of flow predetermined to yield a desired solids content at the sheet through-put rate involved. The system is self-controlling, as a temporary decrease in liquid absorption causes an increase in liquid level thereby increasing sheet-liquid contact time and pressure. Conversely, an increase in adsorption causes the level to fall, reducing contact time and pressure and thereby the volume of liquid absorbed. An equilibrium liquid level is reached at the point where the absorption is equal to the rate of liquid in-put to the system.

BACKGROUND OF THE INVENTION

This invention relates to a system for uniformly impregnating absorbent webs, such as saturating-grade kraft paper. More particularly, this invention relates to a process for self-regulating the quantity of solution, such as a resin absorbed by a moving paper web without altering the solution flow or concentration.

Typically, paper and other web and woven sheets are saturated (treated) with resin and other solutions on machines which immerse the sheet in a pan of the liquid. Upon emergence from the pan, surface liquid is removed by some means, usually scraper bars or squeeze rolls. The amount of liquid absorbed by the sheet is controlled by varying the time that the sheet is in contact with the liquid in the pan and the pressure of this contact. This is usually done by varying the depth of immersion in the pan; greater depth resulting in longer contact time and greater pressure. The sheet is then dried to remove the solvents and leaves solid resin from the solution in the sheet. With this method it is necessary to continually test the finished product for solids content, and on the basis of these results, to vary the immersion depth to control the process. Variations in sheet absorbency, effectiveness of surface liquid removal, liquid viscosity, etc. lead to variations in solids content of the finished product and frequent changes in immersion depth. Off-standard product is generated due to these variations and the time lag between system upsets and the necessary corrective actions. This time lag is largely the result of the need to produce samplable product before the control system can begin to function. Once sampled, the product must be tested, the results transmitted to an operator who must then make the necessary adjustments. Thus, this process, in addition to delaying reaction, is susceptible to sampling errors, testing errors, and human errors when making the needed corrections.

In the manufacture of resin-impregnated products, such as paper sheets impregnated with phenolic resins for production of laminates, control problems are frequently encountered because of variation in adsorbency of the paper sheet within a roll and from one roll to the following roll. This variation in absorbed material may amount to no more than plus or minus 10%, but the difference is cumulative and soon requires correction.

For each grade of paper, resin absorption depends primarily upon time in contact with the resin solution but also varies somewhat with the temperature of the resin and pressure created by the depth of immersion.

Various methods have been used in the prior art to maintain the resin level in the resin pan in the laminate industry, and, in similar industries, for regulation of sizing solution for a textile web, a coating color for a paper web, or backing solution for a carpet. For example, in U.S. Pat. 2,583,267, the control method alters a property of the fluid which is applied to the material, specifically by diluting with water according to weight signals from the treating pan in which a textile web is dipped. U.S. Pat. 3,082,734 shows a float-control method for controlling the coating of a fabric, and U.S. Pat. 2,981,638 describes a weight-control method for altering the extent of the arc of contact between carpet and roll immersed in a bath or, alternatively, for varying the concentration of the starch in the bath.

When impregnating a heavyweight kraft saturating paper with resin solution, it is common practice to set the paper feed rate for the maximum drying capacity of the oven. An overflow control or a float-control method is normally utilized to maintain the resin depth. According to the operator's judgment, the dip roll is lowered into the resin pan to a depth which will produce the desired impregnation. When dried impregnated paper emerges from the drying oven, samples are obtained and immediately tested. Within about fifteen minutes, results are obtained which may necessitate raising or lowering the dip roll in the resin bath so as to decrease or increase, respectively, the pickup of absorbed resin. If the quality of the paper changes from one end of the paper sheet to the other or if there is an appreciable variation between successive rolls of paper, the absorbency may be changed to such a degree that an off-grade product is produced or resin is wasted, because the difference may be slight enough that the operator is not able to detect the change because of imprecision in testing techniques. Furthermore, at an operating speed of several hundred feet per minute, considerable amounts of expensive resin-impregnated paper can be produced and must be discarded if too low in resin content.

It is the general object of this invention to provide a self-regulating control system for applying a uniform amount of resin at the desired rate to a moving web. Another object of this invention is to provide a resin pickup apparatus which does not require frequent manual adjustment or sensitive detection equipment. A further object of this invention is to provide a resin pickup system having a relatively uniform pickup through the imposition of a steady infeed rate. Other objects and advantages of this invention will become apparent from the following description taken in conjunction with the accompanying drawings.

SUMMARY OF THE INVENTION

It has been found that a moving paper web, such as saturating-grade kraft paper, may be uniformly impregnated with resin in a dip coating apparatus using the discovery that any imbalance between a fixed resin solution infeed rate and variations in the web receptivity for resin produced a cumulative volumetric difference in the resin solution contained in the dip pan. This volumetric difference results in a change in the level of resin in the dip pan and hence in depth of immersion of the web. This change in depth of immersion alters both the time and hydrostatic pressure of the web immersion in the resin in such manner as to counteract the variation in web receptivity which initiated the change. Changes in resin level, while not available in systems having overflow or level controllers, are too small to afford significant control in other conventional systems. It is only when the dip pan is arranged so as to have minimum surface area that the effect becomes a useful control mechanism. As a result, it has been found that the resin surface should be restricted to only a few inches longer and wider than the width and thickness of the actual web to obtain the improved rate of response of the system.

BRIEF DESCRIPTION OF THE DRAWINGS

For a better understanding of the consequences of the present invention, reference should be made to the accompanying drawing in which:

FIGS. 2–5 represents the upsetting of the several variables against the response time to return to equilibrium for one system.

DETAILED DESCRIPTION OF THE INVENTION

Figure 1:
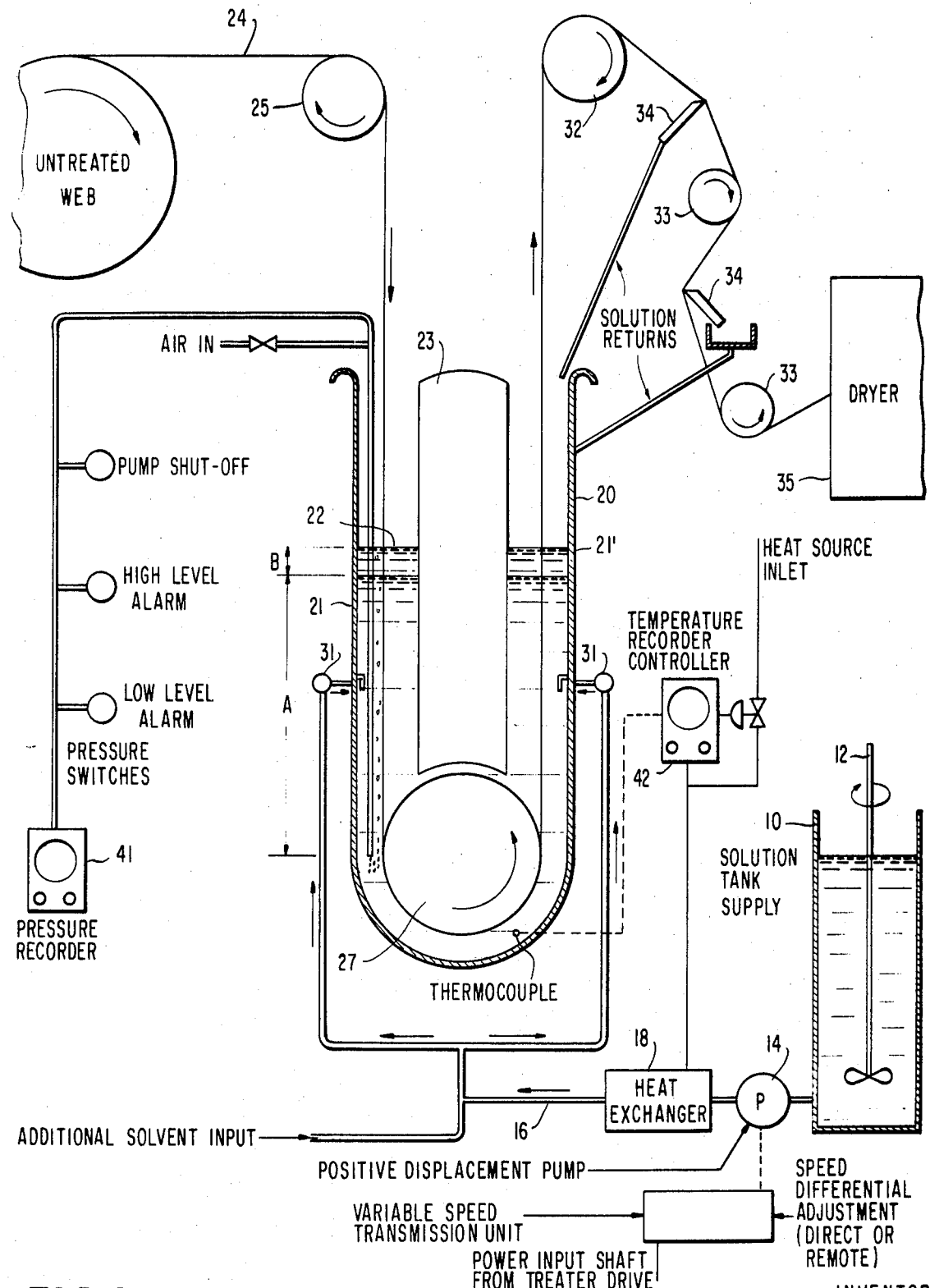
FIG. 1 is a diagrammatic illustration of the apparatus which can be employed to practice the continuous process of this invention.

In conventional dip pan impregnators, the dip pans generally are shallow with large surface areas. The level of resin in these pans is frequently controlled by overflow weirs or level controllers. The large surface area is helpful in making the resin level insensitive to variations in resin addition rate or variations in web receptivity for the resin. On the contrary, however, significantly better results accrue if the dip pan is constructed entirely differently. To practice this invention the dip pan should be relatively deep with minimum surface area so that any volumetric change in resin in the pan will cause a maximum change in resin depth. It is possible to limit the surface area to not more than a few inches on all sides of the web. This is accomplished, in part, by insertion of a baffle inside the web run to displace resin from this area. The gain or amplification factor of the control function used in this invention is proportional to the ratio of the web width to the free resin surface. Since the web width is generally a constant, this factor thus becomes proportional to the reciprocal of the surface area of the resin. This gain or amplification factor determines speed of response of the system to an upset and the time which will elapse before the system recovers from the upset and is shown by Equations 1 and 2. The larger the gain factor the faster the response and the shorter the recovery time and the more uniform the impregnation will be.

Practically however there are limits as to how small the surface area may be. Space must be left around the web as it enters and leaves the resin to permit ease of threading and safe operation. In general, an inch or less of clearance is sufficient. Clearances of as much as five inches may be tolerated without reducing the gain factor below practical levels.

Referring now to FIG. 1, a sufficient amount of resin solids is placed into solution, supply tank 10 and mixed with solvent by agitator 12 to provide a solution having a solids range of from 40–70% by weight solids. Delivery pump 14, preferably a positive displacement pump, moves the resin solution through conduit 16 from solution tank 10 to heat exchanger 18 where the temperature is controlled between ambient temperature and 150° C. depending upon the particular resin used. The resin solution then passes to dip coating pan 20 where it may be introduced to the pan through a plurality of distribution points 31.

Dip coating pan 20 is designed with sides 20, 21' as close together as practical so as to provide minimum resin surface area 22 for continuously moving web 24 to effect a pronounced automatic change in resin level with a change in resin absorbed. The minimum resin surface area is also further affected by the inclusion of baffle 23. The untreated web 24 passes over guide roll 25 into the resin solution, under bottom roll 27, out of the resin solution and over guide roll 32. Excess surface resin is removed by scraper bars 34 and the excess resin is returned to the dip coating tank. The treated web is guided past the scraper bars by guide rolls 33 and into drying oven 35. Results obtained are equally good with varying web speeds from 100–500 feet per minute and even much faster. The dip coating pan may be equipped with pressure recorder 41 and temperature recording controller 42.

To illustrate the application of this process the initial immersion depth may be, for instance, represented by vertical distance A shown in FIG. 1. As the web passes through the tank, a predetermined amount of resin is absorbed as the web travels through the pan for a predetermined distance at a fixed speed. However, should the web fail to pick up the desired amount of resin for some reason, such as saturability of the paper, then the height of the liquid in the dip coating pan is automatically increased until a new equilibrium is reached, shown in FIG. 1 by vertical increment B. This increase in height gives a longer wetting time and increased hydrostatic pressure upon the web; therefore there is greater resin pickup at a fixed web speed and resin infeed. Of course, if the resin pickup becomes excessive, the reverse occurs. In a dip coating pan of the type shown in FIG. 1, a change in resin liquid level of relatively large magnitude is created by a relatively small volumetric change in resin because of small surface area 22.

It is well to note that this system has the advantage of requiring no sampling or testing to insure that the treated sheets contain the desired amount of resin. Indeed, the need of an operator to oversee the system is reduced to the point where one operator may care for several treaters. The time lag between a system upset and final correction of the process is reduced considerably. In fact, the time lag has been reduced because the system begins to correct itself simultaneously with the imposition of the upset and therefore gains the time required for sampling, testing and operator corrections. The reduction in time lag becomes even greater when the operator does not achieve the proper degree of correction as a result of one sampling, testing, and corrective action sequence. The material savings here through reduced produciton of off-target and out-of-specification material are substantial. The labor savings in terms of reduced testing requirements and reduced need for operator attention are also significant. Other savings may accrue by the use of improved control to reduce average solution usage. Improved product uniformity, reduced warpage, and reduced risk of phenolic bleed-through in the case of decorative laminates are also achieved. Naturally, since sampling, testing, and operator judgement and action are all but eliminated, the chances of errors occurring from these sources are virtually eliminated as well.

To show that the response times (time for the system to return to equilibrium) for the system of this invention are lower than for other systems in present use, they were compared on a pilot unit. The response time was calculated under a number of conditions varying one factor in each conditions independently in order to study the effect of each factor on the response time. The basic equation relating immersion depth to the rate of solution into and out of the system is shown as Equation 1:

(1) $$I = \frac{W}{A}(q_i - q_o)dt$$

wherein I is the immersion depth, W is the web width, A is the total surface area of solution in the pan, and $q_i$ and $q_o$ are the rates of solution into and out of this system, respectively. The solution of this equation requires a defined relationship between immerson depth and the rate of solution leaving the system. D'Arcy's Law states that the amount of solution absorbed by a porous structure is proportional to the product of the absorption time and the pressure which forces liquid into and through the pores. It should be realized that the functional relationship between immersion depth and absorption rate is peculiar to each treating system. In this system, a change in immersion depth changes both the time and the pressure involved, so a functional relationship between absorption rate and the square of the immersion depth is indicated. This relationship expressed mathematically is shown by Equation 2:

(2) $$q_o = Kl^2$$

wherein K is a constant which is peculiar to the treater, web and solution involved. K was calculated for a particular system which required a 12" immersion depth to yield a 30% solids pickup of a solution containing 55% solids at a speed of 200 f.p.m. Throughout this study, these conditions, except for immersion depth, were standard. The effect of each on response time was studied by varying it independently and calculating the time required to correct a ±3 precentage point upset in solids pickup to with ±1 percentage point of the target. The response time of the system was determined over a solids pickup range of from 25–50%, a solution solids range of from 40–70%, and a speed range of from 100–500 f.p.m. In addition, the effect of the magnitude of the upset on response time was studied over a range of from ±2 to 5 percentage points of solids pickup. The results are shown in FIGS. 2–5. In general, it can be said that the response time of this system improved as resin content and/or speed increases and as percent solution solids and/or magnitude of upset decreases. The effect of solution solids content on response time was not great. The significant point in all of these results was that the response time of this system to correct a ±3 percentage point upset was less than one minute, over the entire range of conditions likely to be encountered in practice. This was far superior to the five, ten or even fifteen minutes required with present control methods to effect an adjustment of the system.

While the invention has been described and illustrated herein by reference to various specific materials, procedures, and examples, it is understood that the invention is not restricted to the particular materials, combinations of materials, and procedures selected for that purpose. Numerous variations of such details can be employed, as will be appreciated by those skilled in the art.

What is claimed is:

1. A process for self-regulating resin absorption in a moving web through a dip pan which comprises:
   (a) supplying resin at a fixed resin solution input to a dip pan having a minimum surface area,
   (b) passing a web having varying resin absorbing characteristics at a constant speed, said speed being proportional to said resin input, through said dip pan,
   (c) said moving web absorbing an amount of resin according to its absorbing characteristics which causes the amount of resin in said dip pan to vary resulting in a sufficiently large change in immersion time and depth to automatically change the amount of resin absorbed from the changed amount of resin in said dip pan as amplified by a minimum volume in relation to the web immersed.

2. The process of claim 1 wherein said moving web is paper.

3. The process of claim 1 wherein said dip coating pan has a web clearance less than five inches.

References Cited
UNITED STATES PATENTS

| | | | |
|---|---|---|---|
| 2,221,780 | 11/1940 | Conrad et al. | 8—34 |
| 2,764,010 | 9/1956 | Williams | 8—34 |
| 1,402,765 | 1/1922 | Haskell | 8—151 |
| 2,583,267 | 1/1952 | Jones et al. | 117—Dig. 2 |

RALPH S. KENDALL, Primary Examiner

U.S. Cl. X.R.

117—102 R, 155 R; 118—8, 419, 429